Figure 1:
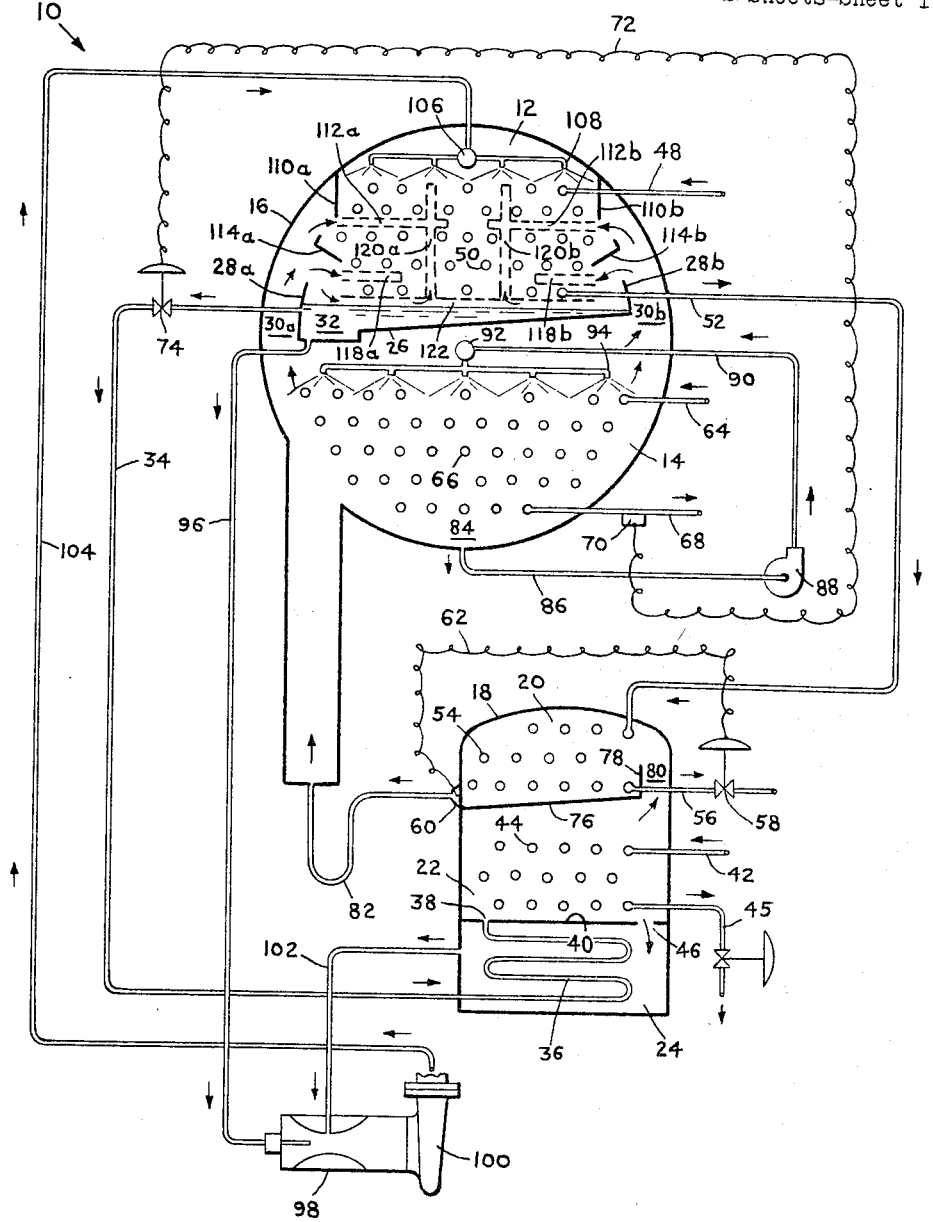

Nov. 8, 1966  D. ARONSON  3,283,533
MIST ELIMINATOR MEANS FOR AN ABSORPTION REFRIGERATION SYSTEM
Filed Sept. 15, 1965  2 Sheets-Sheet 1

DAVID ARONSON
*INVENTOR.*

BY Daniel H. Bobis
*Atty*

DAVID ARONSON
*INVENTOR.*

United States Patent Office 3,283,533
Patented Nov. 8, 1966

3,283,533
MIST ELIMINATOR MEANS FOR AN ABSORPTION REFRIGERATION SYSTEM
David Aronson, Upper Montclair, N.J., assignor to Worthington Corporation, Harrison, N.J., a corporation of Delaware
Filed Sept. 15, 1965, Ser. No. 487,375
6 Claims. (Cl. 62—494)

This invention relates to an absorption refrigeration system. More particularly, the invention relates to a mist eliminator means for an absorption refrigeration system. Still more particularly, the invention relates to an absorber for an absorption refrigeration system in which the mist eliminator means is embodied.

An absorption refrigeration system, such as the lithium bromide type, operates at extremely low vapor pressure which results in large volume flow of refrigerant vapor. Large tonnage machines are characterized by free open areas to permit vapor flow without undue pressure loss. Unless otherwise constrained, this permits droplets of the recirculated absorber solution being sprayed over cooling tubes to bounce off the tubes and subsequently enter the refrigerant outside of the area provided for this purpose. Performance is adversely affected by even small amounts of contamination of refrigerant with absorber solution.

Heretofore the various types of spray eliminators that have been incorporated in the absorption refrigeration system to catch droplets and cause them to coalesce and drain back to the absorber solution sump have caused large pressure drops in the refrigerant vapor required to pass therethrough. These prior art eliminators generally consisted of a series of bent plates forming a tortuous path for the refrigerant vapor flow, or were made of packs of mesh or screens which permit vapor flow but prevent straight through flow of droplets of liquid. Another disadvantage of the prior art eliminators was that they were bulky and inefficient.

Accordingly, it is an object of the present invention to provide a novel mist eliminator means for the absorber of an absorption refrigeration system which overcomes the prior art disadvantages; which is simple, reliable and economical; which prevents contamination of the refrigerant by the sprayed brine solution through the use of baffles to prevent the solution from leaving the absorber; which utilizes passages for vaporous refrigerant penetration into the tube bundle; which provides for co-action between the impervious baffles and the passages whereby the droplets of sprayed brine solution not caught on the heat transfer surfaces of the tube bundle but by the baffles will be directed to lower tubes of the tube bundle means for additional absorption and heat transfer; which provides for pressure losses substantially limited to those necessary and normally associated with penetration of vapor into the tube bundle means of the absorber; which places the tube bundle means within the baffles and under the brine solution spray headers to aid in the confinement of the sprayed solution; which permits most of the side and all of the bottom of the tube bundle means to be open for penetration by the refrigerant vapors.

Other objects and advantages will be apparent from the following description of the embodiment of the invention and the novel features will be particularly pointed out hereinafter in the claims; reference being had to the accompanying drawings forming a part of this specification wherein like reference characters designate corresponding parts in the several views. Furthermore the phraseology or terminology employed herein is for purpose of description and not of limitation.

In the drawings:
FIGURE 1 is a diagrammatic illustration of an absorption refrigeration system embodying the present invention,
FIGURE 2 is an enlarged partial sectional view of the low pressure longitudinal shell in which the novel mist eliminator means is embodied.

Figure 2:
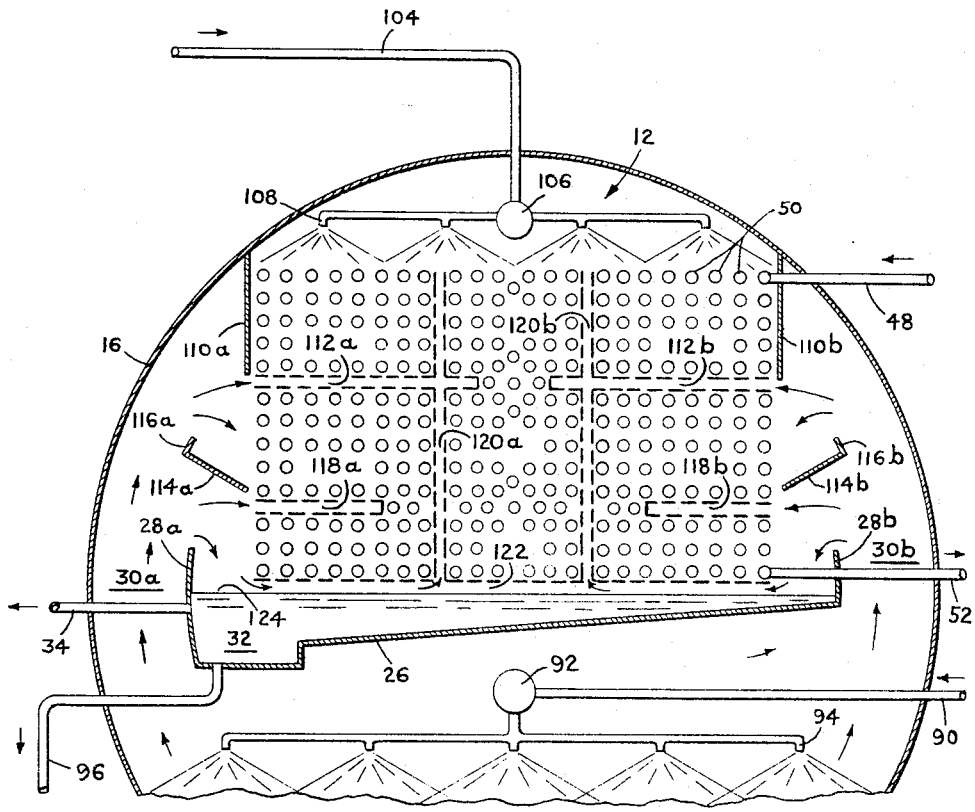

In the ilustrated embodiment of the invention shown in FIGURES 1 and 2 the novel mist eliminator means is incorporated in an absorption refrigeration system, designated generally as 10.

Absorption refrigeration system 10 is illustrated diagrammatically in FIGURE 1 and contains a brine or saline solution which is circulated therein in varying concentration. The brine solution is made up of a suitable mixture of an absorbent, such as lithium bromide, and a refrigerant, such as water. The brine solution in the system is referred to as a weak solution whenever it contains a quantity of refrigerant such that the solution is rendered weak in absorbing properties. A weak solution will generally consist of between 55% to 62% lithium bromide. The brine solution in the system is referred to as a strong solution whenever the quantity of refrigerant contained in such solution is deficient so as to enhance the refrigerant absorption properties of said solution. A strong solution will generally consist of between 66% and 69% lithium bromide.

Absorption refrigeration system 10, as shown in FIGURE 1, includes an absorber 12 and an evaporator 14 formed in a low pressure longitudinally extending shell 16. A high pressure longitudinally extending shell 18 is disposed below shell 16 and has formed therein a condenser 20, a generator 22, and a heat exchanger 24.

Shell 16 has a partition 26 extending therethrough to separate absorber 12 from evaporator 14. Partition 26 has upturned edges 28a and 28b formed at its sides to define passages 30a and 30b formed between the upturned edges 28a and 28b respectively, and the wall of shell 16. Edges 28a and 28b also have a secondary function to serve as spray guards. A sump 32 is formed adjacent to edge 28a for collecting the weak solution in absorber 12.

A line 34 is connected to deliver weak solution from the upper level of sump 32 to heat exchanger 24. Line 34 connects into coil 36 wherein the weak solution will pass in indirect heat exchange relationship with strong solution leaving generator 22 prior to the weak solution entering the generator 22. Since the pressure of the generator 22 is substantially higher than the pressure in absorber 12, absorber 12 is disposed above generator 22 by a suitable amount to create the necessary head in line 34 to permit the gravity flow from absorber 12 to generator 22. The preheated weak solution will enter the generator from coil 36 as shown in FIGURES 1 and 2 through opening 38 on one side of wall 40 which wall separates the generator 22 and the heat exchanger 24.

Generator 22 is maintained at a pressure of about 3.0 inches of mercury, and refrigerant vapors are boiled from weak brine solution for the purpose of concentrating the latter. Heat is supplied from a suitable source, such as low pressure steam at 15 p.s.i.a. (not shown), to generator 22 through line 42 which connects into tube bundle 44. The steam or its condensate is discharged from bundle 44 in line 45. The weak solution will pass in indirect heat exchange relationship with the steam and its condensate and be caused to boil. The refrigerant vapor driven from the boiling solution will pass upwardly towards the condenser 20. The concentrated hot strong solution will pass out of the generator 22 through opening 46 to enter heat exchanger 24.

Absorber 12 has cooling water delivered thereto from a suitable source (not shown) through line 48 which delivers it to tube bundle 50. The cooling water is discharged in line 52 which delivers it to tube bundle 54 disposed within condenser 20. The cooling water is discharged from condenser 20 through line 56. Valve 58 may suitably control the quantity of flow of the cooling water passing through absorber 12 and condenser 20 responsive to the indicated temperature at any other point in system 10, as for example the discharge temperature from condenser 20 as signalled by bulb 50 and capillary 62.

Liquid to be cooled in evaporator 14 of absorption refrigeration system 10 is introduced by line 64 into the cooling chiller coils or tube bundle 66 in which it is cooled prior to discharge therefrom in line 68. A temperature sensing means such as bulb 70 and capillary 72 may be connected to automatically regulate control valve 74 disposed in line 34, so as to regulate the quantity of weak solution being delivered to generator 22 and therefore ultimately control the degree of cooling obtained in evaporator 14.

Condenser 20 is formed in shell 18 by transverse partition 76 which has one end connected to shell 18 and the other end 78 extending upwardly therefrom to form a passage 80 through which the refrigerant vapor from generator 22 will enter condenser 20. The refrigerant vapor will come in contact with condenser tube bundle 54 and be cooled and condensed thereby. The refrigerant condensate will accumulate at the bottom of the condenser and be forced by the existing pressure differential to pass through line loop 82 to evaporator 14, wherein a portion of the condensate will flash and the remainder of the condensate will be collected in the bottom portion 84 of evaporator 14. The refrigerant in portion 84 will be drawn off in line 86 by the suction of refrigerant pump 88 which will deliver the refrigerant in line 90 for discharge through spray header 92. The refrigerant is sprayed from nozzles 94 of spray header 92 over cooling chiller coils 66 in which the water is chilled and the refigerant evaporated on the surface of coils 66, thereby taking heat from the water circulating in coil 62 and chilling it. The refrigerant vapor in evaporator 14 passes through passages 30a and 30b into absorber 12, as described more fully hereinafter.

Sump 32 has a second line 96 disposed at the bottom thereof wherein the weak solution will be delivered to flow mixer 98 wherein its flow and the suction of brine pump 100 will induce the flow of concentrated solution in line 102 from heat exchanger 24 into flow mixer 98. The now intermediate solution inflow mixer 98 will be discharged from pump 100 into line 104 which is connected to spray header 106. Spray header 106 has a plurality of nozzles 108 from which the intermediate solution is sprayed on to the surfaces of absorber tube bundle 50 so as to effect a continuous condensation to maintain the absorber interior at an atmosphere of 0.3 inch of mercury.

As seen in FIGURES 1 and 2 vertical baffles 110a and 110b extend downwardly from shell 16 and terminates adjacent to the upper horizontal passages 112a and 112b respectively. Baffles 110a and 110b are disposed below spray header 106 and outwardly of tube bundle 50 to form an impervious barrier which initially contains the sprayed brine solution in absorber 12. A second pair of baffles 114a and 114b are disposed intermediate the upwardly extending edges 28a and 28b and the downwardly extending baffles 110a and 110b, respectively. Baffles 114a and 114b serve as spray guards and extend from a point adjacent the sides of tube bundle 50 outwardly and slightly upwardly therefrom. A flanged end 116a and 116b is formed at the outer end of baffles 114a and 114b, respectively, and extends substantially perpendicular therefrom, preventing spillage therefrom. Any droplets of the sprayed brine solution leaving tube bundle 50 at this point will be caught by baffles 114a and 114b which will guide them back into tube bundle 50 for further dilution therein. A second pair of horizontally extending passages 118a and 118b is formed below baffles 114a and 114b and extends inwardly from the outer sides of tube bundles 50 terminating a short distance from the pair of vertically extending passages 120a and 120b. Passages 120a and 120b extend the vertical length of tube bundle 50 and communicate the bottom space 122 with upper horizontal passages 112a and 112b. Space 122 is formed between the bottom of tube bundle 50 and the upper lever 124 of the weak solution collected in the bottom of absorber 12 and sump 32.

The vaporized refrigerant entering absorber 12 through passages 30a and 30b, respectively, will pass into space 122 and passages 112a and 112b, 118a and 118b, and 120a and 120b. The vaporized refrigerant will penetrate the tube bundle 50, especially from the bottom space and the various pasages, wherein it will be absorbed into the sprayed solution through the absorption process on contact with the solution. Tube bundle 50 serves to cool the solution and remove the heat liberated to the solution when the refrigerant vapor is absorbed. The sprayed solution absorbs sufficient refrigerant vapor so as to collect in sump 32 in the form of weak solution.

Except for the area enclosed by baffles 110a and 110b the remainder of the sides and complete bottom of tube bundle 50 are open. Such an arrangement (1) limits the pressure losses to those necessary and normally associated with the penetration of vapor into the tube bundle 50 of the absorber. (2) permits maximum penetration of the vaporized refrigerant.

By placing the tubes of tube bundle 50 inside the various baffle means and under the spray header 106, the tubes themselves serve to contain the droplets in the immediate area of tube bundle 50 and eliminate the need for separate entrainment separators.

In view of the foregoing the present invention is able to give higher performance, with less risks of contamination than the prior art systems which employed separate entrainment separators.

Suitable purge means (not shown) may be utilized in the system to remove noncondensibles from the refrigerant.

It will be understood that various changes in the details, materials, arrangements of parts and operating conditions which have been herein described and illustrated in order to explain the nature of the invention may be made by those skilled in the art within the principles and scope of the invention as expressed in the claims.

What is claimed is:

1. An absorber for an absorption refrigeration system having a condenser, an evaporator which passes refrigerant vapor to the absorber, the absorber and a generator, the absorber comprisng:

(a) a casing,
(b) a tube bundle means disposed in the casing,
(c) a spray header means disposed in the casing for discharge of brine solution which passes over the tube bundle means and into which the refrigerant vapor is absorbed,
(d) baffle means disposed outwardly of the tube bundle means to prevent the sprayed brine solution from leaving the absorber and to permit the refrigerant vapor to enter the absorber for penetration into the tube bundle means whereby the refrigerant vapor will be absorbed into the sprayed solution,
(e) the tube bundle means including oppositely disposed sides and a bottom remote from the spray header means,
(f) a plurality of passage means formed within the tube bundle means,
(g) at least one passage means extending from the bottom of the tube bundle means in the direction of the spray header means,
(h) at least one passage means extending from one of the sides of the tube bundle means in the direction of the other of the sides, and
(i) the passage means extending from the bottom of the tube bundle means to permit distributed penetration of the refrigerant vapor into all of the said passage means.

2. The combination claimed in claim 1 wherein:
(a) the baffle means including a plurality of baffle means,
(b) a first baffle means extending from the casing to cover a part of the sides of the tube bundle means,
(c) the passage means at the side of the tube bundle means formed below the first baffle means,
(d) a second baffle means disposed below the first baffle means,
(e) the second baffle means extending outwardly of and slightly upwardly from the side of the tube bundle means to catch and return any brine solution splashing outwardly of the tube bundle means, and permitting entrance of the refrigerant vapor into the passage means of the tube bundle means.

3. The combination claimed in claim 2 wherein:
(a) a second passage means formed below the second baffle means and extending from the side of the tube bundle means inwardly thereof.

4. The combination claimed in claim 3 wherein:
(a) a liquid collection portion formed at the bottom of the absorber,
(b) a space formed to extend between the bottom of the tube bundle means and the top of the liquid collection portion, which space defines a third passage means.

5. The combination claimed in claim 4 wherein:
(a) the passage means extending from the bottom of the tube bundle means communicating the third passage means and at least one of the passage means extending inwardly from the side of the tube bundle,
(b) the passage means extending from the bottom of the tube bundle means extending substantially the full length of the tube bundle means.

6. The combination claimed in claim 2 wherein:
(a) a flange formed on the outer edge of the second baffle means extending in the direciton of the tube bundle means to prevent spillage over the outer edge.

References Cited by the Examiner
UNITED STATES PATENTS
1,085,624 2/1914 McKee _____ 62—494 X

References Cited by the Applicant
UNITED STATES PATENTS
2,210,496 8/1940 Peltier.
2,565,943 8/1951 Berestneff.
2,959,931 11/1960 Leonard.
3,124,938 3/1964 Leonard.

LLOYD L. KING, *Primary Examiner.*